United States Patent
Chandra et al.

(10) Patent No.: US 7,159,051 B2
(45) Date of Patent: Jan. 2, 2007

(54) FREE PACKET BUFFER ALLOCATION

(75) Inventors: Prashant R. Chandra, Sunnyvale, CA (US); Uday Naik, Fremont, CA (US); Alok Kumar, Santa Clara, CA (US); Ameya S. Varde, Santa Clara, CA (US)

(73) Assignee: Intel Corporation, Santa Clara, CA (US)

( * ) Notice: Subject to any disclaimer, the term of this patent is extended or adjusted under 35 U.S.C. 154(b) by 233 days.

(21) Appl. No.: 10/668,550

(22) Filed: Sep. 23, 2003

(65) Prior Publication Data
US 2005/0066081 A1  Mar. 24, 2005

(51) Int. Cl.
*G06F 3/00* (2006.01)
(52) U.S. Cl. .............................. 710/56; 710/52; 710/57
(58) Field of Classification Search ................. 710/56, 710/52, 57
See application file for complete search history.

(56) References Cited

U.S. PATENT DOCUMENTS

| | | | | |
|---|---|---|---|---|
| 4,700,185 A | * | 10/1987 | Balph et al. ................. 370/451 |
| 5,610,905 A | * | 3/1997 | Murthy et al. ............... 370/401 |
| 5,751,951 A | * | 5/1998 | Osborne et al. ............ 709/250 |
| 5,781,801 A | * | 7/1998 | Flanagan et al. ............. 710/56 |
| 6,055,558 A | * | 4/2000 | Lin et al. ..................... 718/100 |
| 6,081,844 A | * | 6/2000 | Nowatzyk et al. .......... 709/233 |
| 6,918,005 B1 | * | 7/2005 | Marchant et al. ........... 711/113 |
| 2002/0174316 A1 | * | 11/2002 | Dale et al. ................... 711/170 |
| 2002/0176430 A1 | * | 11/2002 | Sangha et al. ............... 370/412 |
| 2004/0131055 A1 | * | 7/2004 | Calderon et al. ........... 370/381 |
| 2004/0218631 A1 | * | 11/2004 | Ganfield ..................... 370/474 |

* cited by examiner

*Primary Examiner*—Fritz Fleming
*Assistant Examiner*—David Martinez
(74) *Attorney, Agent, or Firm*—Buckley, Maschoff & Talwalkar LLC

(57) ABSTRACT

According to some embodiments, systems an apparatuses may have a communication path to exchange information packets. A processor may process information packets. A buffer pool cache local to the processor may store free buffer handles for information packets when the buffer pool cache local to the processor is not full. A non-local memory may store the free buffer handles for information packets when the buffer pool cache local to the processor is full.

10 Claims, 7 Drawing Sheets

FREE PACKET BUFFER ALLOCATION

BACKGROUND

A network device may facilitate an exchange of information packets via a communication network. For example, a network switch or router may receive streams of information packets from other devices, such as Personal Computers (PCs). The network device may then transmit the information packets to other network devices, such as to other network switches or routers. Those network devices may in turn forward the information packets until they reach an appropriate destination. Each information packet may be stored in memory prior to, during, and/or after processing by the network device. In some cases, the memory is arranged as one or more packet buffers that are used to store and/or retrieve the information packets.

DETAILED DESCRIPTION

Figure 1:
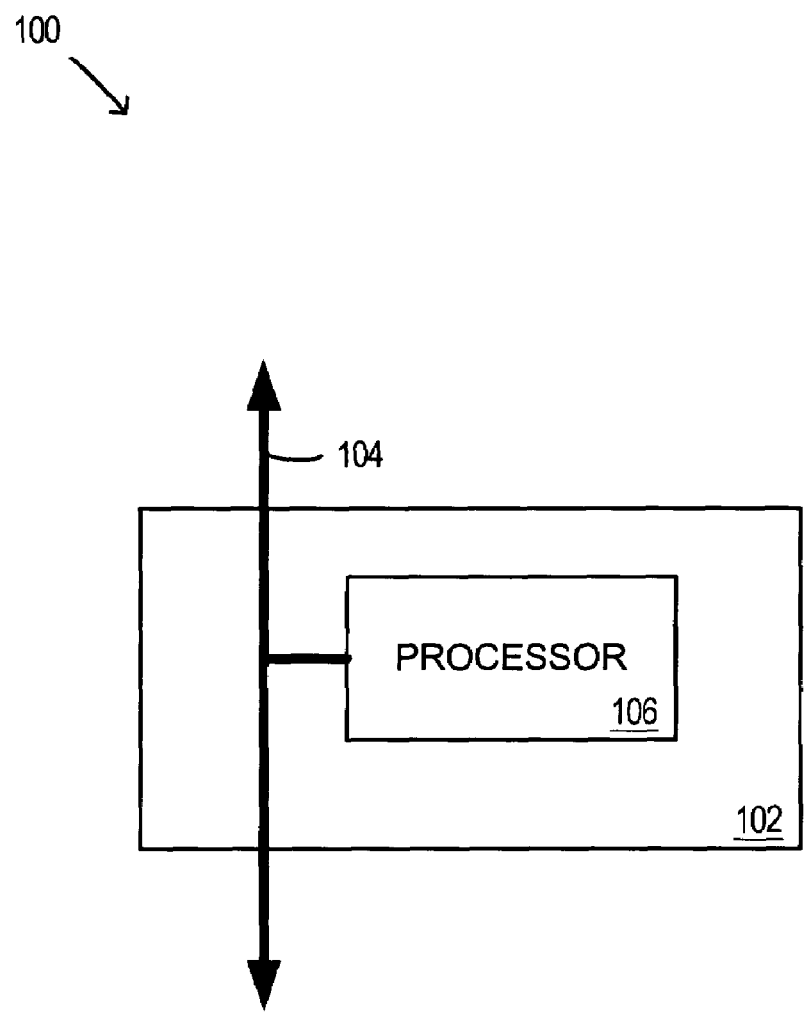
FIG. 1 is a block diagram of a network device.

Some embodiments described herein are associated with data or information "packets." As used herein, the term "packet" may refer to any set of data or information, such as a set of data associated with a communication protocol. By way of example, an information packet might be associated with the Fast Ethernet Local Area Network (LAN) transmission standard 802.3-2002® published by the Institute of Electrical and Electronics Engineers (IEEE).

In addition, some embodiments are associated with a "network device." As used herein, the phrase "network device" may refer to any device adapted to exchange packets of information. Examples of network devices include the Intel® IXP 2800 network processor or an Intel® XEON™ Processor coupled with an Intel® E7501 chipset. Network devices may comprise one or more network components. As used herein, the term "network component" may refer to a network device, or a component, piece, portion, or combination of network devices. Examples of network components may include a Static Random Access Memory (SRAM) device or module, a network processor, and a network communication path, connection, port, or cable.

Moreover, some embodiments are associated with "packet buffers" and "memory buffers" or "memory registers." As used herein these terms may refer to any device or component adapted to store information. For example, a memory buffer or memory register may be a fixed-sized area of a Dynamic Random Access Memory (DRAM) device or module that is used to store and retrieve information packets.

Network devices may receive and transmit large volumes of information packets in very short periods of time. High-speed networks have increased the demand on network devices to process and/or exchange information packets at extremely high rates of speed. In order to process information packets, network devices may need to store the information packets in short or long-term memory. Because the volume of packets may be extremely large, determining where to store each individual information packet may become a taxing process that could degrade the performance of a high-speed network device.

For example, when an information packet is received at a network device, a memory buffer may need to be retrieved ("fetched") to store the packet. To facilitate this process, the network device may store the identification information for various buffers in memory. The network device may access the memory to retrieve the identification information or "handle" associated with an empty memory buffer. Using this handle, the network device may then fetch the empty buffer from a pool of buffers and store the information packet in the fetched buffer. When the information packet is transmitted and/or otherwise no longer in need of storage, the buffer is sent back to the pool of buffers ("freed"), and the identifier is returned to the list of identifiers stored in memory.

The stored identifiers may be arranged in various configurations including a linked-list. The linked-list of identifiers may contain identity information for each available buffer in the buffer pool. Part of this information may include a reference to an adjacent identifier in the list (a link). This linking information may assist the network device in locating free buffers by acting as a pointer to the identifier associated with the next available empty buffer. When a buffer is fetched for use, the identifiers may need to be unlinked so that the network device does not try to store the next incoming packet in the same (and now filled) buffer. Similarly, when a buffer is freed and its identifier returned to the linked-list, the information may need to be updated to re-create the link.

These transactions that may be required for processing and storing information packets may introduce a significant amount of latency to a high-speed network device. In many situations, the linking and unlinking of buffer identifiers may introduce a high percentage of this latency at least in part because the path from the network processor to the memory may have a lower line speed than the paths local to the processing device or chip. The path may also be shared by other processing devices, creating a bottle-neck in the already slower connection.

FIG. 1 is a block diagram of a network device 100. The network device 100 may include at least one network component such as a network processor 102 connected to a communication path 104. The network processor 102 may be any known or available type of network processing device or module including, but not limited to, an Intel® IXP 2800 network processor. The network processor 102 may include at least one processor 106 which may be adapted to processing and/or exchanging information packets. The processor 106 may be in direct, wireless, continuous, or intermittent contact and/or connection with or to the communication path 104. The communication path 104 may be any type or configuration of communication ports, paths, cables, wires, and/or transceiver devices. For example, the communication path 104 may include one or more Optical Carrier 9.952 Gbps (OC-192) Wide Area Network (WAN) or Local Area Network (LAN) high-speed connections in conformance with the American National Standards Institute (ANSI) Alliance for Telecommunications Industry Solutions (ATIS) Synchronous Optical Network (SONET) standards (ATIS T1.105, 106, 117, and 119).

Figure 2:
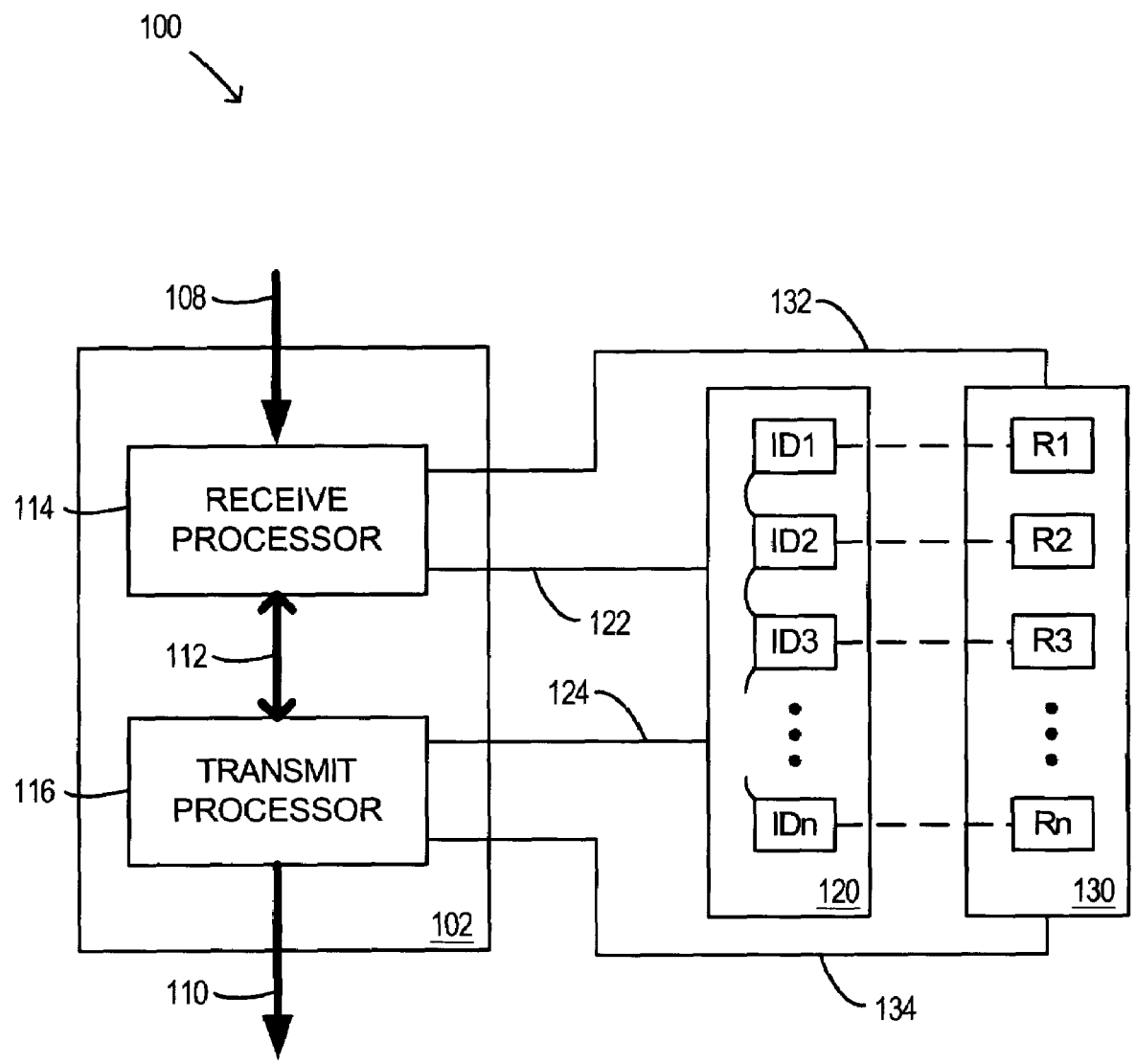
FIG. 2 is a block diagram of a network device.

FIG. 2 is a block diagram showing a network device 100, having multiple network components 102, 108, 110, 120, 130. The network device 100 may include a network processor 102, an input path 108, an output path 110, and memory modules 120, 130. Input path 108 may be any type or configuration of path, port, or connection and may be or include a communication path 104 as described herein. The input path 108 may provide information packets to one or more components of the network device 100, such as the network processor 102. The network processor 102 may include, as shown in FIG. 2, multiple processors 114, 116. Either, both, or all processors 114, 116 may be or include a processor 106 as described herein.

The receive processor 114 may be configured to processes information packets received, for example, through the input path 108. The transmit processor 116 may be connected to the receive processor 114 via an internal communication path 112, and may be configured to process and/or route information packets. Through the internal communication path 112, information packets may be exchanged between the two processors 114, 116 to facilitate and/or consummate information packet processing, routing, storing, and/or transmission. Processed packets may then be transmitted to other network devices, components, or other destinations via output path 110. Output path 110 and input path 108 may be sections, components, and/or portions of the same path or connection. The single connection including both input path 108 and output path 110 may be or include a communication path 104 similar to that described herein in conjunction with FIG. 1.

When an information packet is received by the network processor 102, it may be directed to the receive processor 114. The receive processor 114 may need to store the information packet to facilitate processing, routing, and/or transmission of the packet. To store the packet, the receive processor 114 may access an identifier memory module 120 containing a linked-list of buffer identifiers (IDs). The identifier memory module 120 may be an SRAM module, and may be connected to the network processor 102 via an identifier access path 122. The ID of an empty (or available) buffer may be retrieved from the identifier memory module 120 by the receive processor 114. Retrieving the buffer ID may require un-linking the buffer ID from other IDs located in the identifier memory module 120. The receive processor 114 may then fetch the free buffer associated with the buffer ID from a buffer memory module 130. The buffer memory module 130 may be a DRAM module containing multiple memory buffers for storing information packets (a buffer pool), and may be connected to the network processor 102 via buffer access path 132.

The various buffer IDs (ID1–IDn) contained in the identifier memory module 120 may be arranged and accessed in any fashion known or available, including via a linked-list (as described herein), or a next-neighbor ring. The various IDs may correspond via a one-to-one relationship to associated buffers or memory registers (R1–Rn) located in the buffer memory module 130.

The information packet may be transferred, for example, via internal communication path 112 to the transmit processor 116 for preparation for transmittal to another network device. The packet may then be transmitted from the network device 100 to one or more destinations. The transmit processor 116 may then free the now empty buffer by returning it via buffer access path 134 to the buffer memory module 130. The transmit processor 116 may also return the buffer ID to the identifier memory module 120 via identifier access path 124. Once returned to the identifier memory module 120, the buffer ID may be re-linked to the appropriate position in the buffer ID chain or ring.

The various access paths 122, 124, 132, 134 may be separate and/or distinct paths or devices as shown in FIG. 2, or may comprise fewer or more paths or devices than shown. For example, there may be only a single identifier access path 122, 124 or a single buffer access path 132, 134 connecting the network processor 102 to the identifier memory module 120 or the buffer memory module 130, shared by both of the processors 114, 116. There may also only be a single connection between the network processor 102 and the memory modules 120, 130. The access paths 122, 124, 132, 134 may have slower line speeds than other communication paths such as the input path 108, the output path 110, and the internal communication path 112. In some situations, the access paths 122, 124, 132, 134 may be or include a Peripheral Component Interconnect (PCI) interface as defined by the PCI Special Interest Group (SIG) in "PCI Local Bus Specification Revision 2.2" (Dec. 18, 1998).

Figure 3:
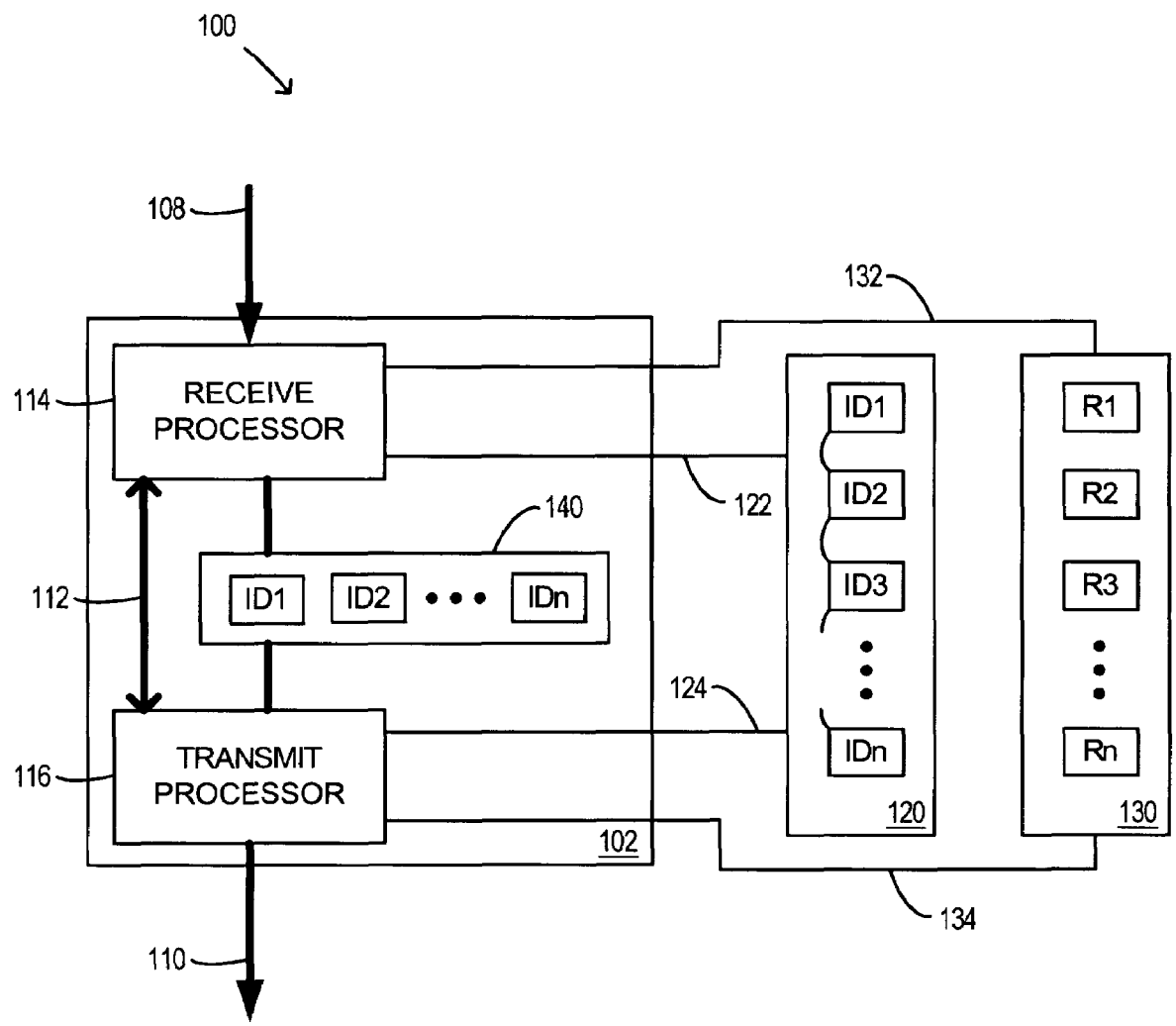
FIG. 3 is a block diagram of an apparatus according to some embodiments.

Turning now to FIG. 3, a network device 100 according to some embodiments is shown. The network device 100 may have fewer or more components than those described in conjunction with FIGS. 1 and 2 (and as shown in FIG. 3). In some embodiments, the network device 100 may include a network processor 102, an input path 108, an output path 110, and memory modules 120, 130. Also in some embodiments, the network components comprising the network device 100 may function and/or be configured similarly to those components as described in conjunction with FIGS. 1 and 2 herein. The network processor 102 may include multiple processors such as one or more receive processors 114 and one or more transmit processors 116 that may be inter-connected via an internal communication path 112. Also connected to the processors 114, 116 may be a local cache 140. In some embodiments, the local cache 140 contains buffer IDs similar to the identifier memory module 120.

The local cache 140 may be any known or available type of memory, and may include one or multiple memory modules. The buffer IDs (ID1–IDn) stored in the local cache 140 may be identical to those stored in the identifier memory module 120 (as shown in FIG. 3), or may be a subset of those stored in the identifier memory module 120. In some embodiments, the buffer IDs stored in the local cache 140 may be different than those stored in the identifier memory module 120 (e.g., some buffer IDs may accessible through the local cache 140 while others are accessible through the identifier memory module 120). The local cache 140 may be located on, within, or connected to the network processor 102 or any of its components 112, 114, 116 (e.g., the local cache 140 may be on the same die). Note that the processors 114, 116 may access information from the local cache 140 more quickly as compared to the memory module 120.

The local cache 140 may be used by the processors 114, 116 in place of the identifier memory module 120. For example, when a packet needs to be stored, the processor 114, 116 may access the local cache 140 to retrieve a buffer ID, instead of accessing the identifier memory module 120 via the identifier access path 122, 124. Because the local cache 140 is located within, on, or adjacent to the network processor 102, the access speed may be significantly higher than that experienced by using the identifier access path 122, 124. Further, according to some embodiments, the buffer IDs stored in the local cache 140 may not be stored in a linked-list. Storing the buffer IDs in a non-linked format may further decrease the amount of time required to fetch and free buffers. In some embodiments, the local cache 140 may replace the identifier memory module 120.

In some embodiments, the local cache 140 may be of a limited size. It is possible, for example, that space or financial constraints may limit the size of memory capable of being successfully employed "on-chip" (i.e., on or within the network processor 102). In such embodiments, the local cache 140 may be sized to be able to handle the majority of buffer ID requests, while the identifier memory module 120 may be used as a back-up when the requests become too numerous for the local cache 140 to handle. For example, the local cache 140 may be a buffer pool cache having one-hundred and twenty-eight memory registers. The registers may each be capable of storing, for example, one buffer ID, giving the local cache 140 the capability of pooling up to one-hundred and twenty-eight buffer IDs. Anytime the local cache 140 is non-empty (e.g., fewer than one-hundred and twenty-eight buffers are required to store packets), the processors 114, 116 may use the local cache 140 to fetch buffer IDs. In some embodiments where the local cache 140 may be capable of handling all buffer ID requests all of the time, the network device 100 may not require the identifier memory module 120 or its attendant access paths 122, 124. In other embodiments where more buffer ID requests may be generated than the local cache 140 can handle (once the number of requests exceeds one-hundred and twenty-eight for example) then the processors 114, 116 may access the identifier memory module 120 as described herein. In some embodiments, when the local cache 140 is non-full (e.g., some buffers are being used too store packets), buffer IDs may be freed to the local cache 140. When the local cache 140 is full, in some embodiments, the buffer IDs may be freed to the identifier memory module 120.

Figure 4:
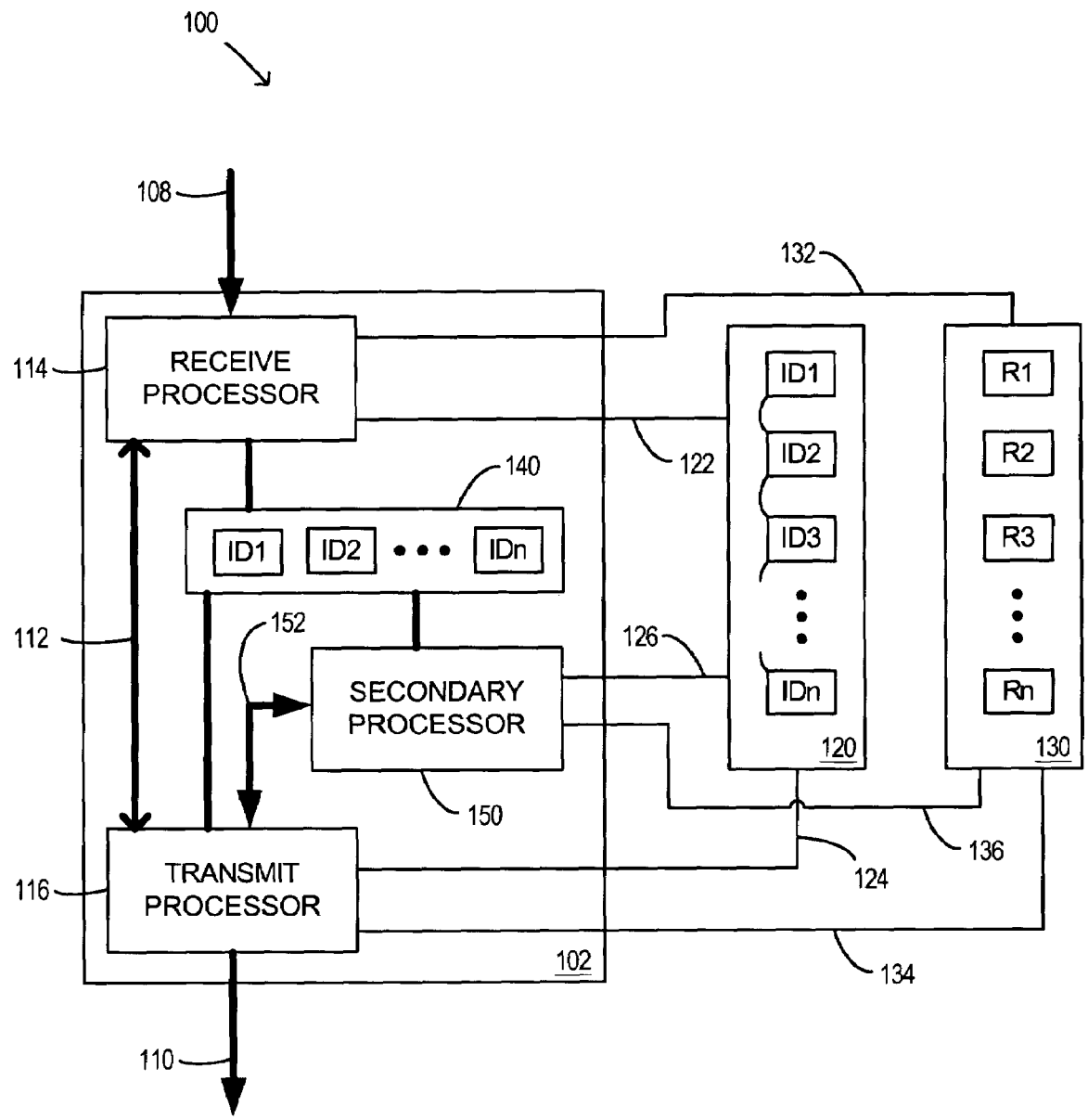
FIG. 4 is a block diagram of an apparatus according to some embodiments.

According to some embodiments, as shown in FIG. 4, a network device 100 may include one or more secondary processors 150. The secondary processor 150 may be configured to perform any number of necessary and/or desired functions, and may be connected to other network processor components 112, 114, 116, 140. As shown in FIG. 4, the secondary processor 150 is connected to the transmit processor 116 via a secondary internal communication path 152. The secondary internal communication path 152 may be a separate path or device than the internal communication path 112 (as shown in FIG. 4) or may be a part, portion, or component of the internal communication path 112. The secondary processor 150 may need to store or retrieve information packets similar to either of the other processors 114, 116, and may therefore be connected to the local cache 140, the identifier memory module 120, and/or the buffer memory module 130. The secondary processor 150 may be connected to the "off-chip" memory modules 120, 130 via access paths 126, 136. The access paths 126, 136 may be separate paths from each other and the other access paths 122, 124, 132, 134 (as shown), or may be portions, parts, or components of one or more combined access paths.

Figure 5:
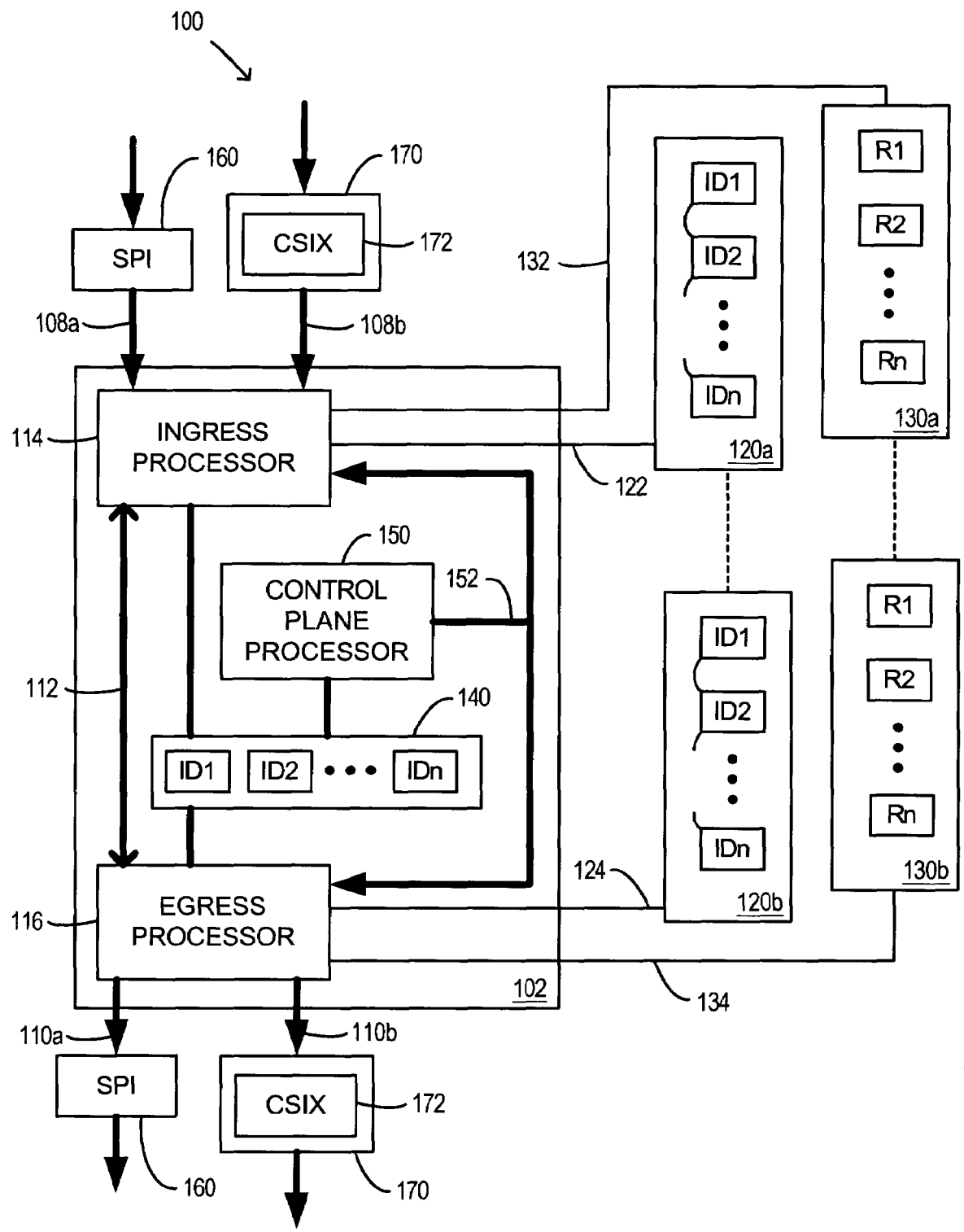
FIG. 5 is a block diagram of an apparatus according to some embodiments.

Turning now to FIG. 5, an example of a network device 100 according to some embodiments is provided. For example, the network device 100 shown in FIG. 5 may be an Intel® IXP 2800 network processor or a similar device. Information packets may be transmitted to the network processor 102 from a communication interface device 160, 170. In some embodiments, the communication interface device may be a Serial Peripheral Interface (SPI) device 160 in accordance with the System Packet Interface Level Four, Phase II standards (SPI-4.2) published by the Optical Internetworking Forum (OIF). The communication interface device may also be a Fabric Interface Chip (FIC) device 170 for transmitting packets from a switching fabric. The FIC 170 may further include a Common Switch Interface (CSIX) device 172 such as that defined by the CSIX-L1 standard published by CSIX, for communication between a Traffic Manager (TM) such as the network processor 102 (and/or the control plane processor 150, described herein) and a switch fabric for Asynchronous Transfer Mode (ATM), Internet Protocol (IP), Ethernet, or other similar data communication applications.

Information packets may arrive at the network processor 102 via input paths 108*a*, 108*b* from either or both of the SPI device 160 and the FIC device 170, respectively. In some embodiments, the input paths 108*a*, 108*b* may comprise a single path, connection, or port connected to one or communication interface devices 160, 170. According to some embodiments, no communication interface devices 160, 170 are needed. In other embodiments, multiple communication interface devices 160, 170 of various types and configurations may be employed.

Processing of the information packets may then be performed, for example, via an Intel® IXP 2800 Ingress Processor 114. The ingress processor 114 may need to store one or more received information packets, and may therefore retrieve one or more buffer IDs from either the local cache 140 or the ingress-dedicated identifier memory module 120*a*. In some embodiments, as described herein, the ingress processor 114 retrieves necessary buffer IDs from the local cache 140 unless the local cache 140 is empty. The ingress processor 114 may then fetch the buffer associated with the retrieved ID from the ingress-dedicated buffer memory module 130*a*.

The stored packet may be transferred via the internal communication path 112 to an egress processor 116, such as an Intel® 2800 Egress Processor 116. The egress processor 116 may process and transmit the packet via an output path 110*a*, 110*b*. The egress processor 116 may need to free the buffer used to store the packet, and according to some embodiments, will free the buffer ID to the local cache 140 if the local cache 140 is not full. Also according to some embodiments, if the local cache 140 is full, the egress processor 116 may free the buffer ID to the egress-dedicated identifier memory module 120*b* via access path 124. In either scenario, the buffer itself may be freed to the egress-dedicated buffer memory module 130*b*. In some embodiments, the processor-dedicated memory modules 120*a*, 120*b*, 130*a*, 130*b* may be in communication with and/or connected to each other to facilitate memory management and storage optimization functions.

According to some embodiments, a secondary processor 150 such as a control plane processor 150, as shown in FIG. 5, may be employed. The control plane processor 150 may be connected to and/or in communication with, for example, either or both of the ingress processor 114 and the egress processor 116 via a secondary internal communication path 152. In some embodiments, as described herein, the secondary internal communication path 152 may be or include the internal communication path 112 or any part, portion, or component thereof. The control plane processor 150 may also be connected to and/or in communication with the local cache 140. The control plane processor 150 may, for example, be used for control plane processing, including the management of policies for execution in the data plane, such as connection management, route management, signaling and exception-handling.

One or more communication interface devices 160, 170 as described herein may be associated with one or more of the output paths 110*a*, 110*b*. In some embodiments, no communication interface devices 160, 170 may be necessary. Output paths 110a, 110b may comprise a single path, connection, or port, or may be separate entities and/or devices as shown in FIG. 5.

Although the memory modules 120a, 120b, 130a, 130b are shown in FIG. 5 as processor-dedicated devices, a single set of shared memory modules 120, 130, a single identifier memory module 120 and two or more dedicated buffer memory modules 130a, 130b, two or more identifier memory modules 120a, 120b and a single buffer memory module 130, no memory modules of one or both types, or any combination thereof may be employed.

Figure 6:
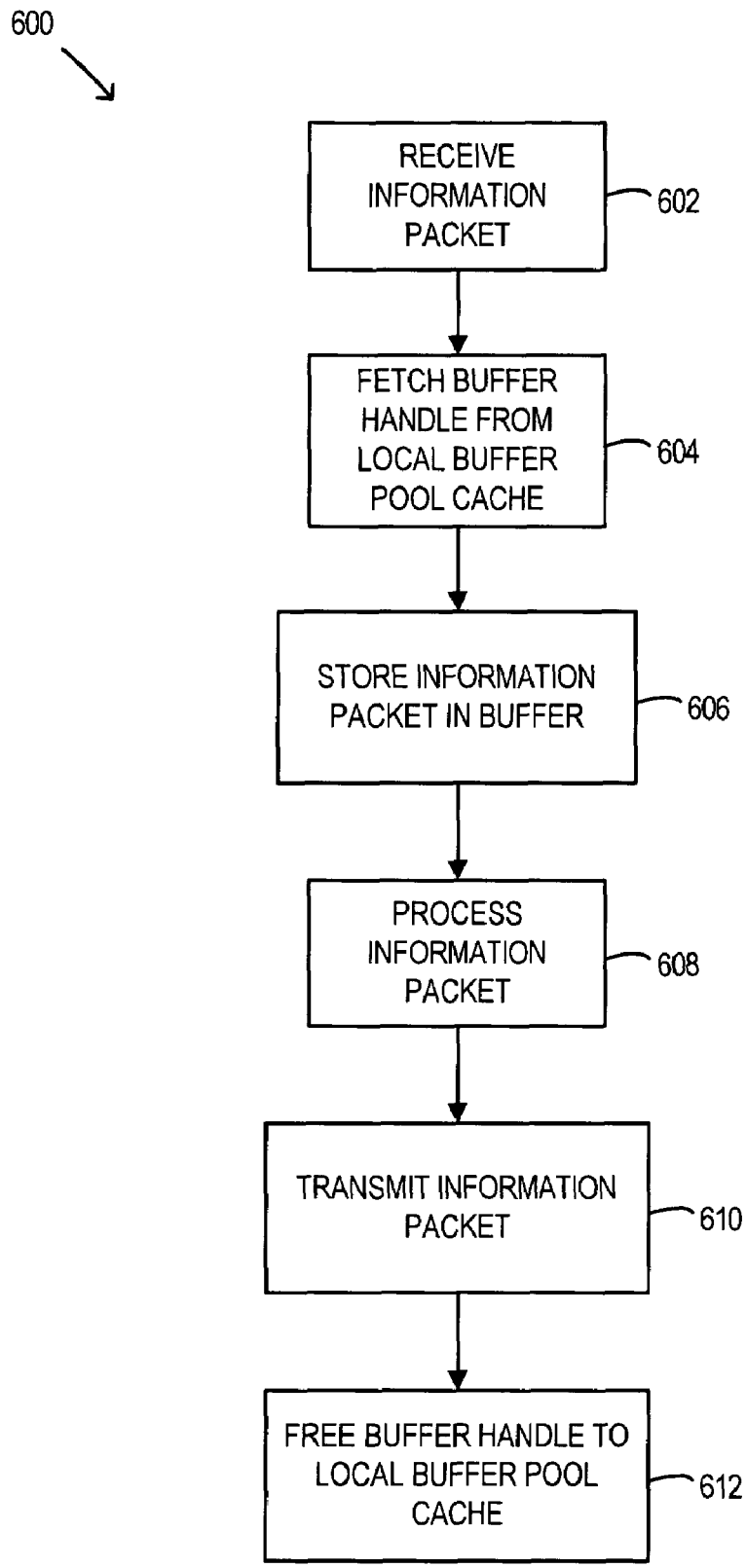
FIG. 6 is a flow diagram of a method according to some embodiments.

FIG. 6 is a flow diagram of a method 600 according to some embodiments. The flow charts described herein do not necessarily imply a fixed order to the actions, and embodiments may be performed in any order that is practicable. The method of FIG. 6 may be associated with, for example, the network device 100 described in conjunction with FIGS. 3–5. Note that any of the methods described herein may be performed by hardware, software (including microcode), firmware, or any combination thereof. For example, a storage medium may store thereon instructions that when executed by a machine result in performance according to any of the embodiments described herein.

At 602, an information packet is received. The information packet may originate from, for example, another network device 100 and/or a communication interface device 160, 170, via an input path 108. The packet may need to be stored in memory. Therefore, at 604, a buffer handle associated with an empty buffer or memory register may be fetched from a local buffer pool cache (such as local cache 140). In some embodiments, the buffer handle may be fetched from the local buffer pool cache 140 when the local buffer pool cache 140 is non-empty. When the local buffer pool cache 140 is empty, according to some embodiments, the buffer ID may be fetched from an external and/or "off-chip" memory such as an identifier memory module 120 as described herein.

Also as described herein, fetching the buffer handle from a local cache 140 may significantly increase the speed at which packet storing operations may be achieved. Using the fetched buffer handle, the buffer may be retrieved and, at 606, the information packet is stored in the buffer. At 608, the information packet is processed in any known, desired, necessary, and/or useful manner. The information packet may then be transmitted to any desired location and/or destination at 610. Once the packet is transmitted and/or otherwise no longer in need of storage, the buffer handle may be freed to the local buffer pool cache 140. In some embodiments, the buffer handle may be freed to the local cache 140 only if the local cache 140 is non-full. When the local cache 140 is full, in some embodiments the buffer ID may be freed to an external and/or "off-chip" memory such as an identifier memory module 120 as described herein.

Figure 7:
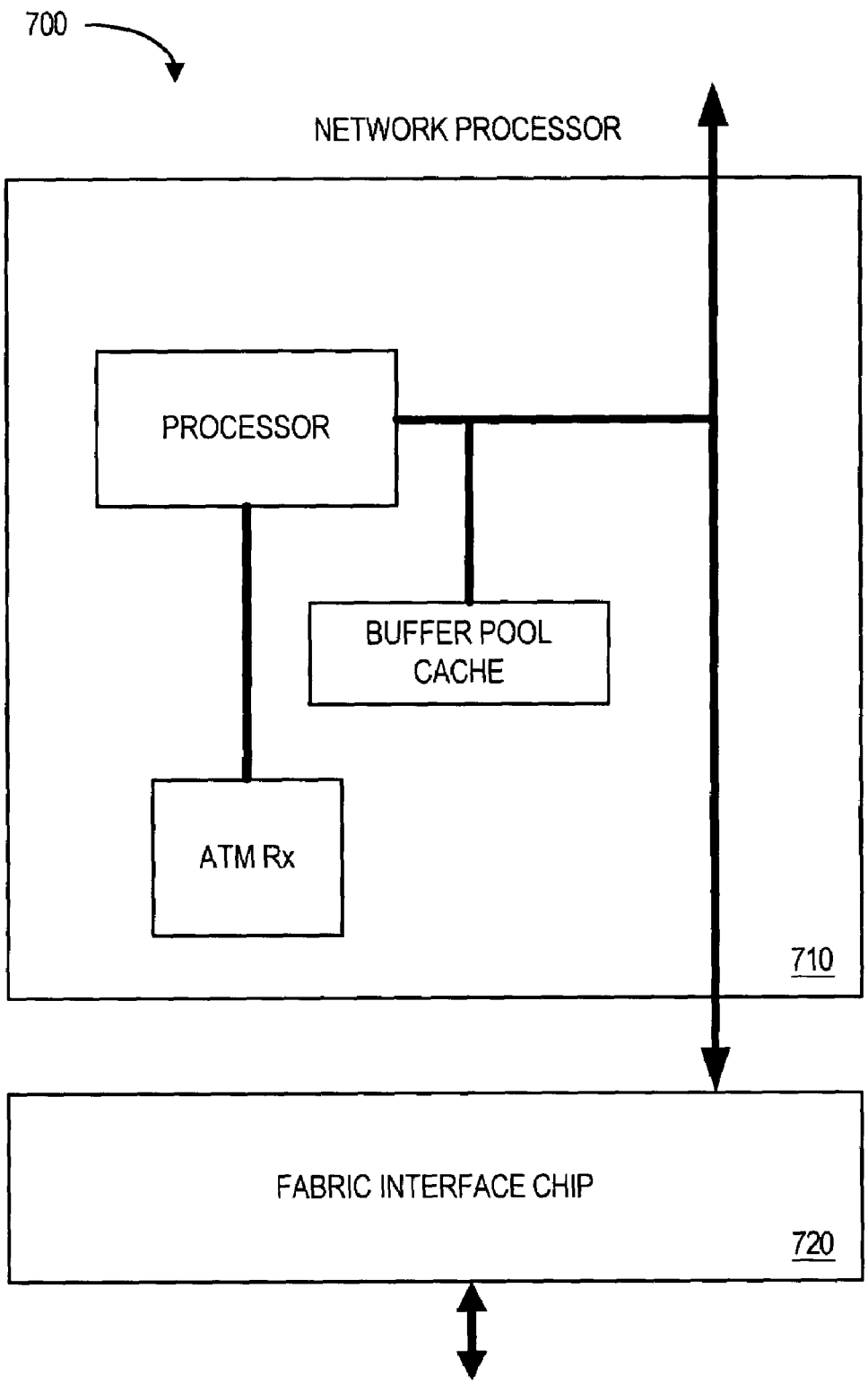
FIG. 7 is a block diagram of a system according to some embodiments.

FIG. 7 is a block diagram of a system 700 according to some embodiments. The system 700 may be associated with, for example, an ATM network switch or router. The system 700 includes a network processor 710 according to any of the embodiments described herein. For example, the network processor 710 might have a processor, a local buffer pool cache, and/or a memory unit to send and/or receive information associated with an ATM cell.

The network processor 700 is coupled to a fabric interface chip 720 adapted to communicate through a switch fabric. For example, the fabric interface chip 720 might arrange for ATM information to be exchanged with another device.

The several embodiments described herein are solely for the purpose of illustration. Persons skilled in the art will recognize from this description other embodiments may be practiced with modifications and alterations limited only by the claims.

What is claimed is:

1. An apparatus, comprising:
a communication path to exchange information packets;
a processor to process information packets;
a buffer pool register cache local to the processor to store a first list of free buffer handles for information packets if the buffer pool register cache is not full, wherein the buffer pool register cache is to store the first list of free buffer handles associated with both receive and transmit operations; and
a non-local memory to store a second list of free buffer handles for information packets if the buffer pool register cache local to the processor is full, wherein the non-local memory is not accessed if the buffer pool register cache local to the processor is not full, and
wherein the free buffer handles in the first list of free buffer handles point to different register locations than the free buffer handles in the second list of free buffer handles.

2. The apparatus of claim 1, wherein the processor is associated with a network processor.

3. The apparatus of claim 2, wherein the processor is a receive processor of the network processor.

4. The apparatus of claim 2, wherein the processor is a transmit processor of the network processor.

5. The apparatus of claim 2, wherein the network processor includes:
a control plane processor.

6. The apparatus of claim 1, wherein the communication path comprises:
an input path for receiving information packets; and
an output path for transmitting information packets.

7. The apparatus of claim 1, wherein the communication path comprises:
a memory path for fetching and freeing buffers.

8. The apparatus of claim 1, wherein the communication path connects to at least one of a dynamic random access memory or a static random access memory.

9. The apparatus of claim 1, further comprising:
a communication interface device coupled to the communication path.

10. The apparatus of claim 1, wherein the first list of free buffer handles is a non-linked list and the second list is a linked-list.

* * * * *